Figure 1:
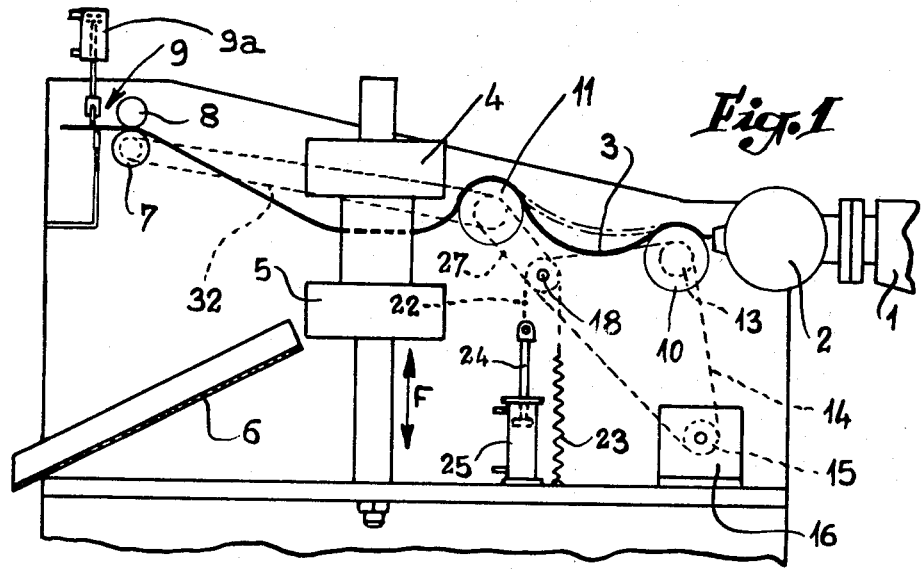

United States Patent
Badoux et al.

[15] 3,707,343
[45] Dec. 26, 1972

[54] MACHINE FOR PRODUCING ARTICLES FROM A STRIP OF EXTRUDED SYNTHETIC MATERIAL

[72] Inventors: Daniel Badoux; Robert Carry, both of 112, rue Franklin Roosevelt, Decines, France

[22] Filed: Aug. 25, 1970

[21] Appl. No.: 66,727

[30] Foreign Application Priority Data
Aug. 26, 1969 France..............................6929103

[52] U.S. Cl...................................425/394, 226/117
[51] Int. Cl. ................................................B29f 3/00
[58] Field of Search....................18/12 TM, TB, TC TF, 18/12 TS, 2 HA; 226/113, 117, 118; 425/404, 317, 308, 394

[56] References Cited

UNITED STATES PATENTS 3,112,055  11/1963  Hartley.................................226/117

FOREIGN PATENTS OR APPLICATIONS 1,250,468  12/1960  France.............................18/2 HA Primary Examiner—J. Spencer Overholser
Assistant Examiner—Michael O. Sutton
Attorney—Alexander and Dowell

[57] ABSTRACT

A machine for producing synthetic plastics articles from a strip of synthetic plastics materials in which the strip is subjected to a stepwise action to facilitate the forming operation. In the machine there is provided an accumulation system between an extrusion die head and a shaping device. In accordance with the present invention the accumulation system is constituted by two heated spaced-apart drums for supporting the synthetics material strip with the drum nearer the extrusion die being rotated continuously and the other drum having imparted to it an abrupt angular movement synchronously with means for moving the synthetic plastics strip.

4 Claims, 2 Drawing Figures

PATENTED DEC 26 1972

3,707,343

INVENTORS
Daniel Badoux
BY Robert Carry

Alexander Noyes
Attorney

MACHINE FOR PRODUCING ARTICLES FROM A STRIP OF EXTRUDED SYNTHETIC MATERIAL

This invention relates to machines for producing articles from a strip of extruded synthetics material.

It has already been proposed to combine with a standard extruding machine an assembly which is able to receive the strip of synthetics material continuously extruded through the extruder die head, and to guide it to a shaping or forming device for producing the desired articles.

Nevertheless, experiments have shown that in practice known machines of this type are not entirely satisfactory. Due to the time necessary for the operation of the shaping or forming device, it is naturally essential to impart to the strip of synthetics material an abrupt longitudinal displacement in such a way that during the periods of stoppage the strip, continuously emerging from the die head, accumulates below the shaping or forming device.

The accumulating synthetics material cools relatively quickly so that it is necessary to provide either heated panels for keeping it at an adequate temperature, or even heating means for bringing it to the said temperature; in both cases, it will be realized that such a requirement complicates the machine construction considerably and in any case is detrimental to a perfect regulation of the temperature. In addition, it is to be noted that the drive means provided downstream of the shaping or forming device for longitudinally displacing the part of the strip which has accumulated during the stoppage upstream of the device, causes localized drawing out which affects the regularity of thickness and texture of the shaped articles.

The improvements which are the object of the present invention are intended to remedy the above-mentioned disadvantages and to facilitate production of a machine which is able to fulfill the various requirements efficiently.

The machine, according to the invention, is characterized in that it comprises, between the extrusion die head and the shaping device, an accumulation system constituted by two heated drums spaced a suitable distance apart in order to support the strip of synthetics material, the drum adjacent to the die head being rotated continuously while the drum which is located immediately upstream of the shaping device according to the direction of displacement of the strip receives an abrupt angular movement in synchronism with drive means which ensure the displacement of this strip through the machine.

Experiments have shown that, on condition of an appropriate regulation of the temperature of the two heated drums, such a machine will ensure entirely satisfactory operation, without any irregularity.

Figure 2:
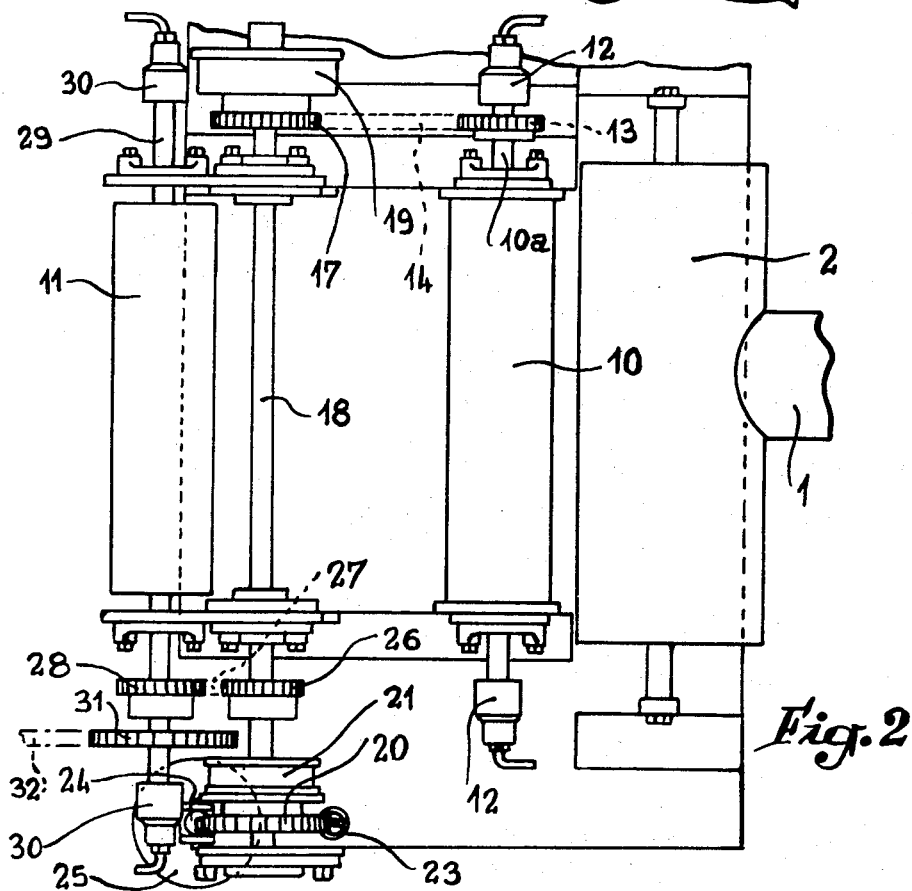

An embodiment of the present invention will now be described, by way of example, with reference to the accompanying drawing, in which:

FIG. 1 is a diagrammatic side view showing the general arrangement of a machine according to the invention; and, FIG. 2 is a plan view, to an enlarged scale, showing the build-up or accumulation system of the machine according to FIG. 1.

In FIG. 1, the reference 1 indicates the end of an extruding machine, whose die head 2 is provided so as to extrude a strip of synthetics material 3. This strip 3 is fed between two plates 4 and 5 of a shaping or stamping device of conventional type, which plates support the two parts of the mould of the shaping device; the upper plate 4 is stationary whereas there is imparted to the plate 5, by means of a cam mechanism (not shown), an alternating vertical displacement indicated by the arrow F. The moulded articles are ejected automatically and are removed in an appropriate manner, for example, on an inclined chute or conveyor such as indicated at 6. The perforated strip which leaves the shaping or stamping device passes between two drive drums 7 and 8, at least one of which is stepwise controlled in its rotation at the instant of the separation of the plates 4 and 5, the strip 3 finally being severed by a guillotine 9, operated by a pneumatic jack 9a.

According to the invention, there is provided, between the die head 2 and the plates 4 and 5, a build-up or accumulation system comprising two drums 10 and 11, and provided so as to store to some extent the strip during the periods when it is not moved, i.e., during the operation of the stamping device 4–5.

As is shown in more detail in FIG. 2 the upstream drum 10 is keyed on a shaft 10a appropriately supported by the frame of the machine. This drum 10 is bored by at least one longitudinal channel, through which passes a fluid at an appropriate temperature; the fluid supply being ensured by means of two rotating seals 12 associated with inlet and outlet pipes. On the shaft 10a is fixed a toothed wheel 13 for a chain 14 which is wound round the output pinion 15 (FIG. 1) of a reduction drive motor 16. The chain 14 and the heated drum 10 are thus driven continuously at an appropriate speed.

This chain 14 is also wound round a wheel 17 (FIG. 2) loosely mounted on an intermediate shaft 18 located lower than the drums 10 and 11. An electromagnetic clutch mechanism 19 is associated with the wheel 17 and is arranged so as to couple together, when it is excited, the toothed wheel 17 and the shaft 18. On the opposite side of the machine frame, this shaft 18 supports a toothed wheel 20 which cooperates with a one-way drive mechanism 21; the latter which is of the ratchet type or similar, allowing the wheel 20 to rotate freely on the shaft 18 in one direction and to drive this shaft only in the opposite direction of rotation. On the wheel 20 there is wound a chain 22 (FIG. 1) one end of which is connected to a return spring 23 whereas the opposite end is connected to the piston of a pneumatic jack 25, operated in synchronism with the opening of the moulding or forming device 4, 5.

The intermediate shaft 18 is also integral with a toothed wheel 26 (FIG. 2) connected by a chain 27 to a wheel 28 keyed on the corresponding end of a shaft 29 supporting the downstream drum 11 of the build-up or accumulation system. This drum 11 is also heated similarly to the drum 10, its supply of fluid also being ensured by rotating seals 30. The shaft 29 is provided with a toothed wheel 31 provided at the side of the wheel 28 and connected by a chain 32 to the lower drum 7 of the stepwise drive mechanism 7–8.

The operation of the above-described machine is easily understood. To start the machine, the electromagnetic clutch 19 is excited, in such a way that the reduction motor 16 continuously rotates not only the upstream drum 10, but also the downstream drum 11 and the drive mechanism 7, 8, the shaping or moulding device 4, 5 naturally being kept in the open position. The continuous displacement of the strip 3 make it possible to pass the latter over the various components necessary for its guidance and its treatment.

When the machine has been made operational, the moulding device 4–5 is placed under the control of a programmer or automatic time-switch which ensures the correct sequence of operations, which causes simultaneously the opening of the circuit for the excitation of the clutch 19 and the periodic operation of the valve connected to the jack 25. Under these circumstances it is understood that the toothed wheel 17 no longer drives the shaft 18, which is, by way of contrast, controlled only one-way by the jack 25; in fact each time the piston 24 of the latter falls in opposition to the reaction of the spring 23, the chain 22 imparts to the wheel 20 and, by means of the chains 27 and 32, to the drums 11 and 7, an angular displacement of given amplitude. By way of contrast, when the piston 24 reascends under the action of the spring 23, the mechanism 21 disconnects the toothed wheel 20 and the shaft 18 in such a way that the latter remains stationary. There is thus obtained the desired stepwise rotational or abrupt angular movement for the heated drum 11 and for the drive mechanism 7–8 associated with the strip 3.

Under these circumstances it is understood that at the time of each stoppage the strip 3 builds up or accumulates between the heated drums 10 and 11, the drum 10 continuing to rotate. The part of the strip comprised between these drums grows longer and thus tends to fall downwards under the effect of the weight; however, this strip remains at a regular temperature due to the heating by the drums. When the drums 7 and 11 are rotated the strip becomes taut without jerks, such that the drum 11 partially recovers the strip length which had accumulated, without the strip suffering an exagerated pulling force.

Moreover, it should be understood that the preceding description has only been given as an example and that it in no way limits the scope of the claimed invention. For example, it will be understood that the means for heating the two drums may be of different construction to that described (for example electric resistances).

We claim:

1. A machine for the manufacture of articles from a strip of extruded synthetic material comprising:
   an extrusion die head;
   a first rotatable heating drum mounted adjacent said die head to support the extruded strip issuing therefrom;
   a first driving mechanism rotating said first heating drum at a substantially constant angular velocity to advance said extruded strip at a substantially constant linear speed;
   a second rotatable heating drum spaced from said first heating drum to support the extruded strip coming from said first drum;
   a second driving mechanism imparting to said second heating drum a stepwise angular motion to advance said extruded strip issuing from said first heating drum by alternative successive periods of movement and of rest;
   a shaping device to form articles from said extruded strip during each period of rest of said second heating drum, said device leaving free passage to said strip during each period of movement of said second heating drum;
   means to actuate said shaping device during each period of rest of said second heating drum;
   a pair of cooperating driving drums to pull between them the extruded strip issuing from said shaping device;
   and driving means to impart to one at least of said driving drums a stepwise rotational motion in synchronism with the stepwise motion of said second heating drum, so as to take up said strip from said shaping device during the periods of rest of said second heating drum.

2. In a machine as claimed in claim 1, means to disconnect said second heating drum from said second driving mechanism and to temporarily connect said second heating drum with said first driving mechanism.

3. In a machine as claimed in claim 2:
   said first driving mechanism comprising a reduction drive motor and a transmission member to connect said motor with said first heating drum;
   said second driving mechanism comprising an intermediate shaft; a driving member loosely mounted on said shaft, a fluid-operated jack to impart to said driving member an angular reciprocating motion, and a one-way mechanism to angularly connect said driving member with said shaft;
   and said disconnecting and connecting means comprising a wheel loosely supported by said intermediate shaft, said wheel being driven by said transmission member, and an electromagnetic clutch interposed between said wheel and said shaft.

4. In a machine as claimed in claim 3, said driving means comprising a second transmission member connecting said second heating drum with said one at least of the driving drums of said pair.

* * * * *